United States Patent [19]

Harting

[11] Patent Number: 5,513,695
[45] Date of Patent: May 7, 1996

[54] SUPPORT OF INCOMPRESSIBLE HEAT TRANSFER SURFACE IN ROTARY REGENERATIVE AIR PREHEATERS

[75] Inventor: Scott F. Harting, Wellsville, N.Y.

[73] Assignee: ABB Air Preheater, Inc., Wellsville, N.Y.

[21] Appl. No.: 393,730

[22] Filed: Feb. 24, 1995

Related U.S. Application Data

[63] Continuation-in-part of Ser. No. 201,276, Feb. 24, 1994, abandoned.

[51] Int. Cl.⁶ .................................................. F23L 15/02
[52] U.S. Cl. .................................. 165/8; 165/10; 165/9; 165/82
[58] Field of Search ....................... 165/10, 8, 6, 82, 165/81, 9, DIG. 17, DIG. 60, DIG. 539

[56] References Cited

U.S. PATENT DOCUMENTS

| | | | |
|---|---|---|---|
| 2,492,788 | 12/1949 | Dennis | 165/10 |
| 3,070,534 | 12/1962 | Kooistra | 165/82 X |
| 3,101,778 | 8/1963 | Hazzard et al. | 165/10 |
| 3,209,058 | 9/1965 | Hazzard | 165/10 |
| 3,314,472 | 4/1967 | Krumm et al. | 165/9 |
| 4,558,732 | 12/1985 | Bellows | 165/8 |
| 4,596,285 | 6/1986 | Dinulescu | 165/82 |
| 4,744,410 | 5/1988 | Groves | 165/8 X |
| 5,336,471 | 8/1994 | Brophy et al. | 165/8 X |

FOREIGN PATENT DOCUMENTS

| | | | |
|---|---|---|---|
| 788146 | 12/1957 | United Kingdom | 165/8 |
| 1000734 | 8/1965 | United Kingdom | 165/8 |
| 2170586 | 8/1986 | United Kingdom | 165/8 |

Primary Examiner—John Rivell
Assistant Examiner—Christopher Atkinson
Attorney, Agent, or Firm—Chilton, Alix & Van Kirk

[57] ABSTRACT

Incompressible ceramic heat exchange blocks which may be catalyst coated having gas flow channels therethrough or other incompressible heat exchange surface are supported in a metal framework to form a removable basket for a rotary regenerative air heater. Between selected rows of the incompressible heat exchange material are layers of compressible corrugated metal heat exchange plates. This layered structure is packed into the framework in the compressed state.

7 Claims, 4 Drawing Sheets

SUPPORT OF INCOMPRESSIBLE HEAT TRANSFER SURFACE IN ROTARY REGENERATIVE AIR PREHEATERS

This application is a continuation-in-part of patent application Ser. No. 08/201,276, filed Feb. 24, 1994, now abandoned.

BACKGROUND OF THE INVENTION

This invention relates to a system for supporting incompressible heat transfer surface within the support framework of a rotary regenerative air preheater.

The typical rotary regenerative air preheater employs corrugated heat transfer plates either with or without intermediate flat plates. The channels between the plates formed by the corrugations form gas and air flow pathways through the rotor in the axial direction. When these plates are tightly packed into the typical basket, the corrugations are slightly compressed to provide a spring force to maintain the tightness under conditions of corrosion, wear vibrations and other operating conditions.

In certain situations, it is desirable to employ a mass of incompressible heat transfer material in place of the spring-like corrugated sheets. For example, it may be desirable to use ceramic blocks as the heat transfer material. Suitable ceramic blocks or sheets are commercially available items such as "Celcor" from Corning Glass Works. Blocks are available in various dimensions such as 10 cm by 10 cm cross section and in varying lengths up to perhaps 50 cm. The material is available with anywhere from 1.2 to 62 channels per square cm and may be catalyst coated. Another form of incompressible heat transfer surface is flat metal plates with spacing tabs bent perpendicularly outward therefrom to space the adjacent plate. Such a configuration forms an incompressible mass as compared to the conventional arrangement of corrugated plates or alternating corrugated and flat plates.

SUMMARY OF THE INVENTION

The invention has the object of supporting a mass of incompressible heat exchange material in a framework and particularly in the basket of rotary regenerative air heater. An object is to provide compressible spring-like members also in the form of heat exchange surface so as to hold the incompressible heat exchange mass tightly in place even after the mass has undergone corrosion or wear during thermal expansion and contraction. Specifically, corrugated heat transfer surface is packed into the basket to provide the spring force necessary to tightly hold the incompressible heat transfer mass.

DESCRIPTION OF THE PREFERRED EMBODIMENT

Figure 1:
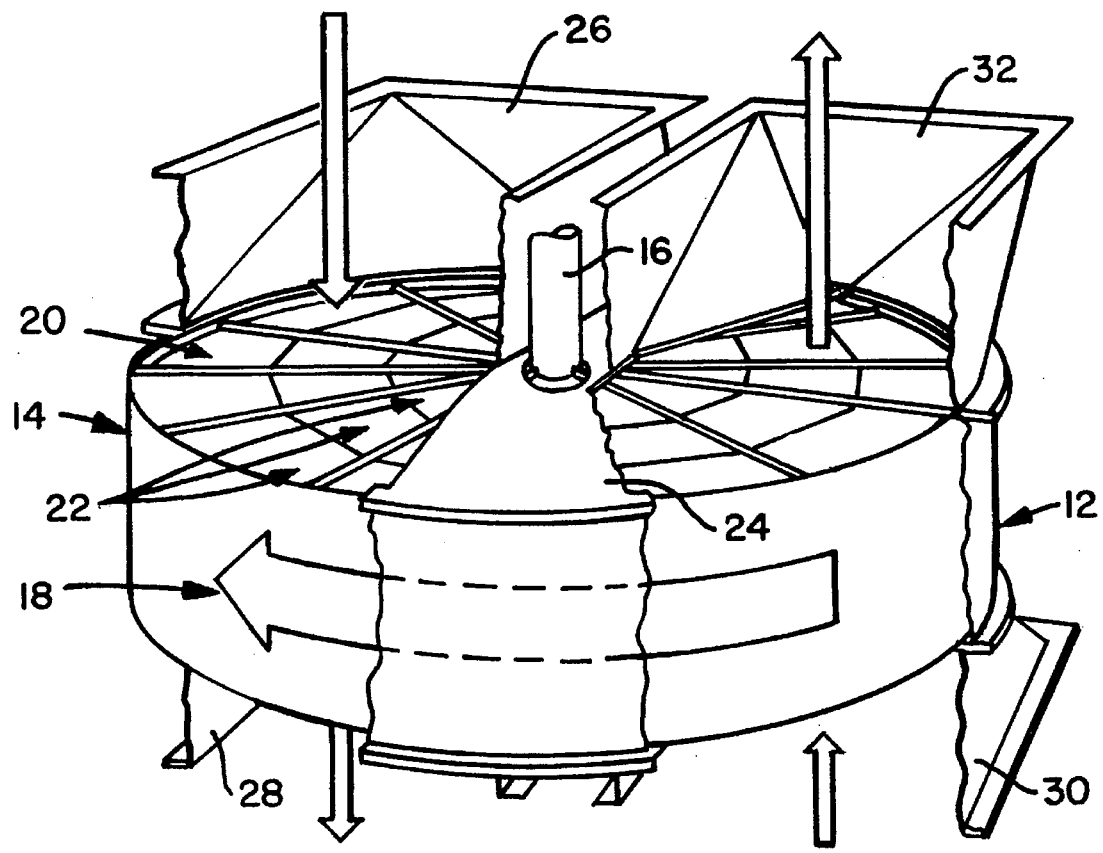
FIG. 1 is a partially cut-away perspective view of a rotary regenerative air preheater.

FIG. 1 is a partially cut-away perspective view of a typical rotary regenerative air heater showing a housing 12 in which the rotor 14 is mounted on drive shaft or post 16 for rotation as indicated by the arrow 18. The rotor is composed of a plurality of sectors 20 with each sector containing a number of basket modules 22. The basket modules contain the heat exchange surface. The housing is divided by means of the sector plate 24 into a flue gas side and an air side. The hot flue gases enter the air heater through the gas inlet duct 26, flow through the rotor where heat is transferred to the rotor and then exit through gas outlet duct 28. The countercurrent flowing air enters through air inlet duct 30, flows through the rotor where it picks up heat and then exits through air outlet duct 32.

In the present invention, the bulk of the heat exchange surface comprises incompressible material. As previously indicated, this may take the form of ceramic blocks or sheets or it may be metal heat transfer plates that are spaced by rigid tabs to form the incompressible mass. The invention will first be described with reference to the channeled ceramic material previously identified.

Figure 2:
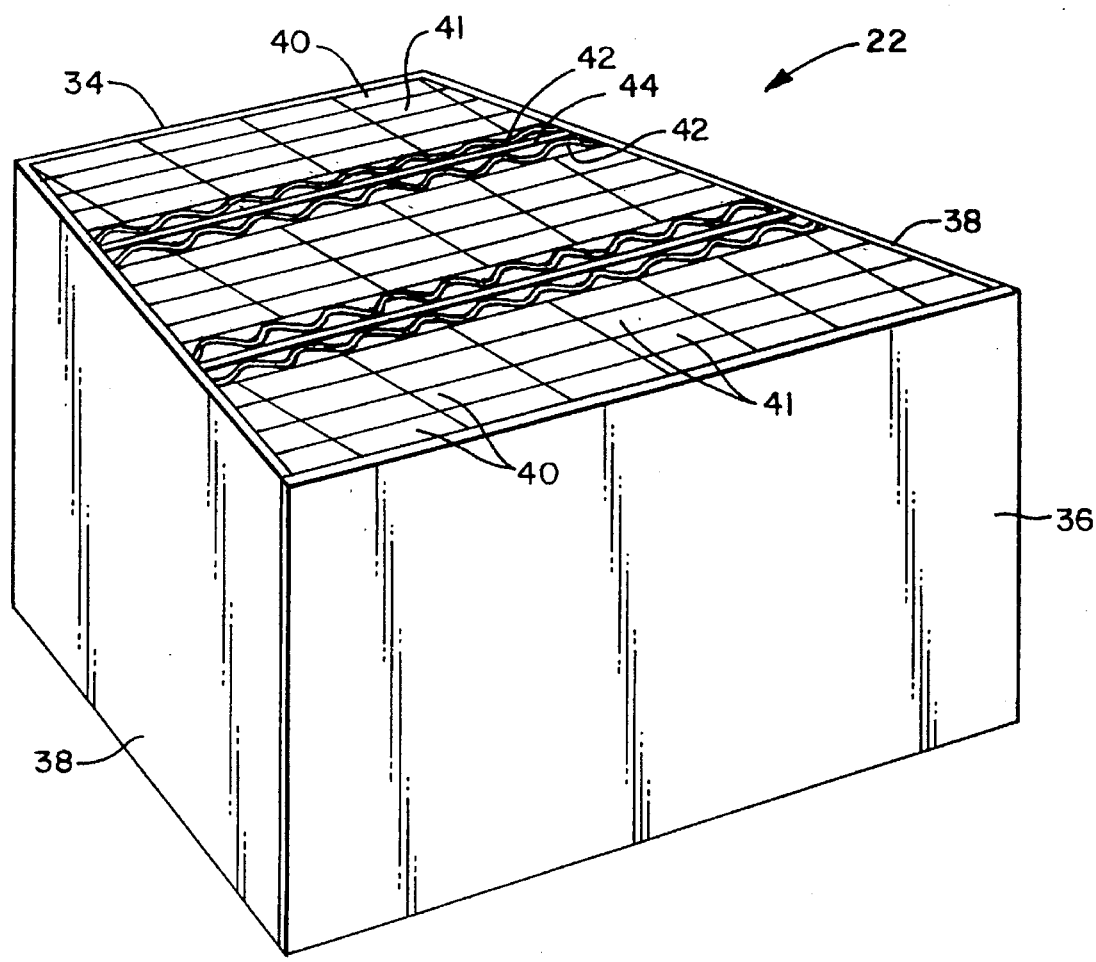
FIG. 2 is a perspective view of an individual basket module according to the present invention.

Referring to FIG. 2 which show a typical individual basket, the basket frame has an inboard end 34, an outboard end 36, and two side walls 38. Typically, the two side walls 38 and the inboard end 34 would be formed from one bent plate. The top and bottom of the basket frame are open for gas and air flow. Mounted within the basket are the ceramic blocks 40. Actually, each of these blocks 40 could be formed from a plurality of ceramic sheets identified as 41.

It can be readily seen that the rigid, incompressible ceramic blocks in the rigid basket frame would make it difficult to fabricate a basket in which the ceramic blocks are immobilized, particularly after the passage of time when the blocks may loosen up due to wear, corrosion, vibration or other factors. After the surface loosens, wear rates increase causing more rapid wear and shortened life. Air preheaters with horizontal rotor shafts are particularly troublesome since the heat transfer surface is constantly undergoing stress reversals due to gravity.

To solve this problem, the corrugated heat transfer surface sheets 42 are employed. A number of these corrugated sheets are packed into the basket to provide the spring force to maintain the tight packing of the surface. A simplified arrangement is shown in FIG. 2 wherein two corrugated plates 42 with a flat plate 44 sandwiched between them is located between each row of the ceramic blocks 40 and extending from top to bottom. Since these rather thin corrugated plates are compressible to some degree, they provide the desired spring force. Also, these are preferably conventional air heater heat exchange plates where the channels formed by the corrugations form gas passages through the rotor and provide heat exchange surface. These plates could also be coated with a catalyst in the case where the ceramic blocks are catalyst coated.

The module is constructed by packing the ceramic blocks or sheets into the basket frame in the desired arrangement to form the incompressible mass. The outboard end 36 is then clamped into position such that the corrugated plates are compressed. The outboard end 36 is then welded into position to maintain the compressed state.

Since the thermal expansion of the metal frame of the basket is greater than the thermal expansion of the ceramic blocks, the gaps which would otherwise open up are taken up by the expansion of the compressed corrugated plates.

Although FIG. 2 illustrates two corrugated plates 42 with an intermediate flat plate 44 between each row, any desired number could be employed depending on the size and design of the particular air preheater. For example, 20 sheets of incompressible ceramic heat transfer surface could be stacked followed by 6 sheets of corrugated heat transfer plates and then continuing to fill the basket with such an alternate arrangement. The packing would then be compressed and the basket frame welded to contain the packing in the compressed state.

Although the invention has been described in relation to channeled ceramic blocks or sheets, it can also be applied to other incompressible heat transfer mass such as the previously mentioned metal plates with rigid tabs.

Figure 3:
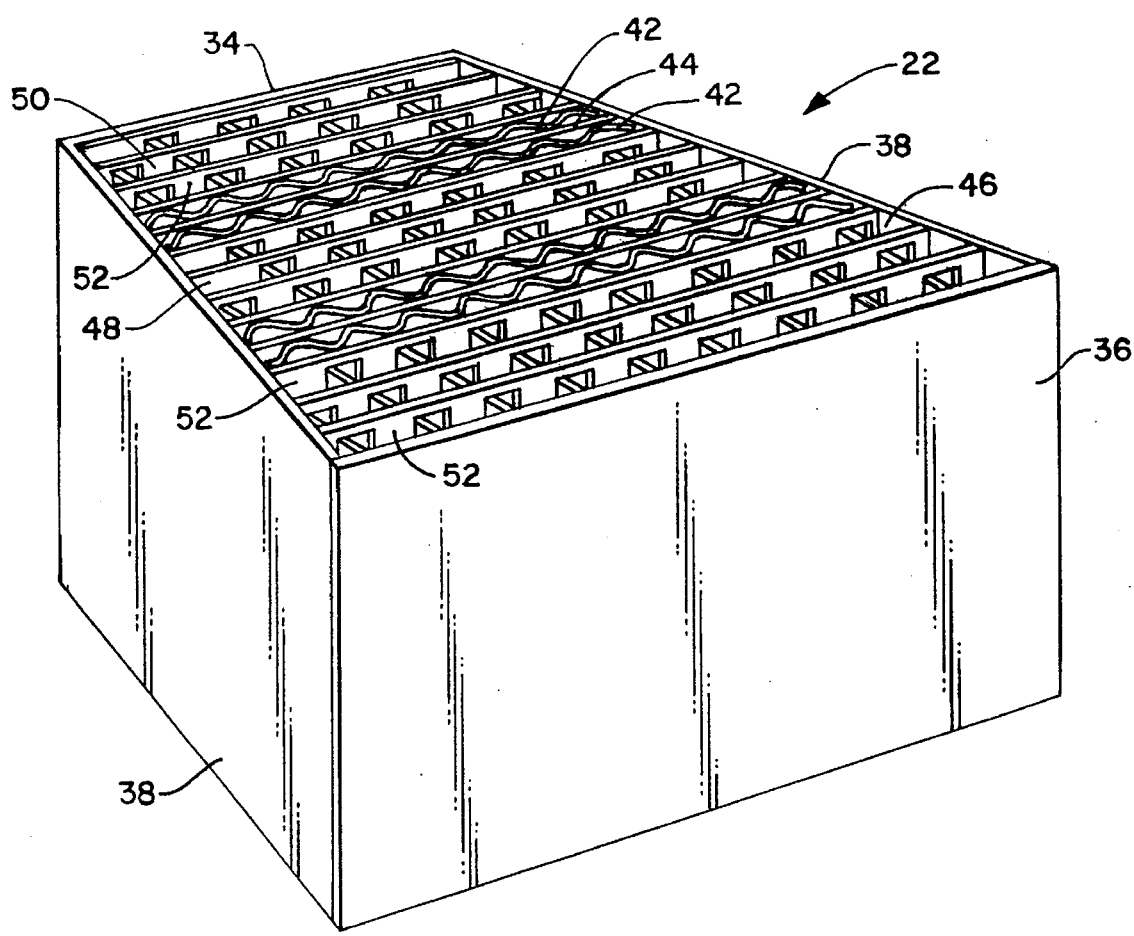
FIG. 3 is a perspective view of an alternate basket module according to the present invention.

FIG. 3 illustrates this other embodiment of the present invention. This arrangement involves sections designated 46, 48 and 50 of incompressible heat exchange mass. Each section is composed of a stack of plates 52 formed with a plurality of relatively small perforations 54 shown in FIG. 4 created by cutting through the plate material along three sides and bending up the plate material so that the plate material which formerly filled the aperatured portions now forms tab portions 56 projecting at right angles to the plate surface. When mounted as a group as illustrated in FIG. 3, these plates form the incompressible heat exchange mass with gas flow channels therethrough between the spaced plates. The incompressibility of the stack is created by the right angle tabs between each of the plates of the stack as compared to the normal arrangement of alternating flat plates and corrugated plates. Each section of incompressible heat exchange mass is then separated by the same arrangement of compressible heat exchange material as in the previous embodiment; namely the corrugated plates 42 and the flat plates 44.

Figure 4:
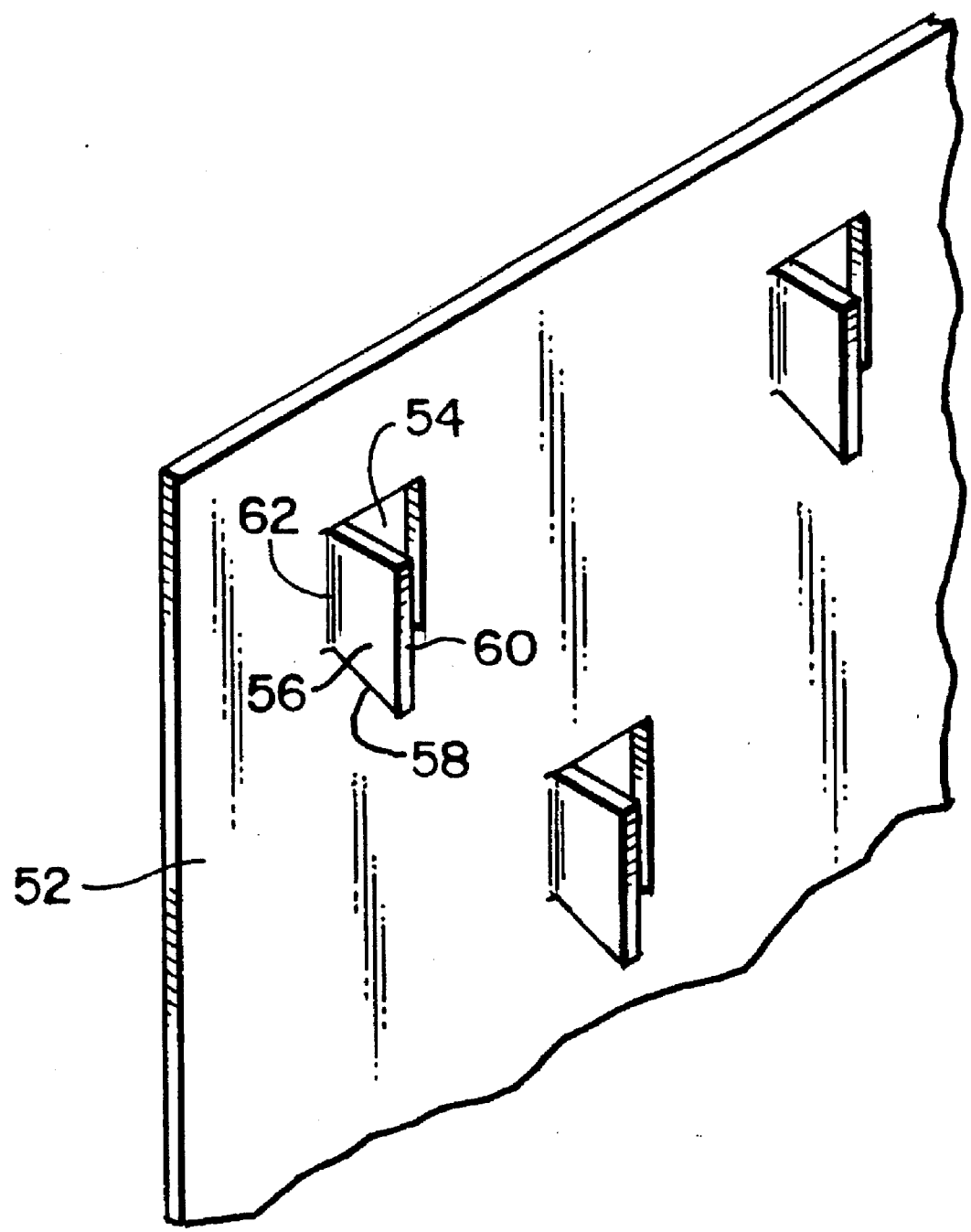
FIG. 4 is a perspective view of an individual plate of the FIG. 3 embodiment.

As shown in FIG. 4, the tabs 56 are preferably trapezoidal in shape, having tapered and divergent side edges 58 which make the distal end 60 wider than the bent end 62. This facilitates the stacking of a plurality of such plates since the distal end 60, being wider than the major portion of the perforation, prevents the tabs 56 from inadvertently slipping through the perforations 54 in adjacent plates. Of desired, the tabs may be brazed or otherwise bonded to the adjacent plate.

I claim:

1. In a rotary regenerative heat exchanger, a heat exchange basket module having open inlet and outlet surfaces for the passage of gases, and comprising:
   a. a heat exchange basket module frame having inboard and outboard ends and two sides adapted to contain heat exchange surface,
   b. a plurality of rows of ceramic incompressible heat exchange surface within said frame with said rows extending parallel to said inboard and outboard ends and from one of said sides to the other of said sides,
   c. a layer of compressible heat exchange material between at least two of said rows, said compressible heat exchange material comprising at least one corrugated heat transfer plate with said corrugations extending between said open inlet and outlet surfaces to form gas flow channels, and
   d. means associated with said frame adapted to maintain said corrugated heat transfer plate in a compressed state.

2. A heat exchanger basket module as recited in claim 1 wherein said compressible heat exchange material comprises a plurality of said corrugated heat transfer plates.

3. A heat exchanger basket module as recited in claim 2 and further including flat heat exchange plates between said plurality of corrugated heat transfer plates.

4. A heat exchanger basket module as recited in claim 1 and further including layers of said compressible heat exchange material between additional rows of said incompressible heat exchange surface.

5. In a rotary regenerative heat exchanger, a heat exchange basket module having open inlet and outlet surfaces for the passage of gases, and comprising:
   a. a heat exchange basket module frame having inboard and outboard ends and two sides adapted to contain heat exchange surface,
   b. at least two separate sections within said frame between said inboard and outboard ends, each section containing a mass of incompressible heat exchange material having a plurality of channels extending therethrough between said open inlet and outlet surfaces to form gas flow channels,
   c. a layer of compressible heat exchange material between each separate section, said compressible heat exchange material comprising at least two corrugated heat transfer plates with said corrugations extending between said open inlet and outlet surfaces to form gas flow channels, and
   d. means associated with said frame adapted to maintain said corrugated heat transfer plates in a compressed state.

6. A heat exchange basket module as recited in claim 5 wherein said mass of incompressible heat exchange material comprises a ceramic material having said plurality of channels extending therethrough.

7. A heat exchange basket module as recited in claim 5 wherein said mass of incompressible heat exchange material comprises a plurality of closely spaced parallel heat transfer plates having tabs extending perpendicularly between said spaced plates to maintain said spacing and form said gas flow channels.

* * * * *